United States Patent [19]
Kane

[11] Patent Number: 6,112,014
[45] Date of Patent: Aug. 29, 2000

[54] PHOTOCOPY MACHINE CAPABLE OF STORING AND TRANSMITTING IMAGE DATA

[76] Inventor: Patrick Kane, 7619 Marlborough Ave., Parma, Ohio 44129

[21] Appl. No.: 08/857,730

[22] Filed: May 16, 1997

[51] Int. Cl.⁷ .................................................... G06F 15/00
[52] U.S. Cl. .......................... 395/115; 358/400; 399/107; 395/114
[58] Field of Search .................................... 395/115, 112, 395/114; 358/400, 500, 406; 382/312, 317; 399/2, 107, 108, 110

[56] References Cited

U.S. PATENT DOCUMENTS

| | | | |
|---|---|---|---|
| 5,363,454 | 11/1994 | Udagawa et al. | 382/191 |
| 5,499,108 | 3/1996 | Cotte et al. | 358/400 |
| 5,668,637 | 9/1997 | Yamaguchi | 358/296 |
| 5,682,250 | 10/1997 | Jefferson | 358/448 |
| 5,718,520 | 2/1998 | Mackay | 400/61 |
| 5,740,335 | 4/1998 | Takayanagi et al. | 395/109 |
| 5,748,947 | 5/1998 | Fukushima | 395/501 |

OTHER PUBLICATIONS

PC World online, Multifunction Printers from HP, Brother, and Lexmark, PC World, Jul. 1995.

*Primary Examiner*—Leo H. Boudreau
*Assistant Examiner*—Bhavesh Mehta

[57] ABSTRACT

A new photocopy machine capable of storing and transmitting image data for scanning an image or document to permit simultaneous facsimile transmitting, printing, and recording on various storage media of the scanned image or document. The inventive device includes a housing that contains a scanning means for scanning an image, various types of storage means for digitally storing the scanned image, a printing means for printing a copy of the scanned image, and a transmitting means for permitting transmission of the scanned image to remote outside sources.

1 Claim, 3 Drawing Sheets

PHOTOCOPY MACHINE CAPABLE OF STORING AND TRANSMITTING IMAGE DATA

BACKGROUND OF THE INVENTION

1. Field of the Invention

The present invention relates to copying machines and more particularly pertains to a new photocopy machine capable of storing and transmitting image data for scanning an image or document to permit simultaneous facsimile transmitting, printing, and recording on various storage media of the scanned image or document.

2. Description of the Prior Art

The use of copying machines is known in the prior art. More specifically, copying machines heretofore devised and utilized are known to consist basically of familiar, expected and obvious structural configurations, notwithstanding the myriad of designs encompassed by the crowded prior art which have been developed for the fulfillment of countless objectives and requirements.

Known prior art copying machines include U.S. Pat. No. 5,006,934; U.S. Pat. No. 4,655,577; U.S. Pat. No. Des. 291,892; U.S. Pat. No. 4,322,157; U.S. Pat. No. 4,298,269; and U.S. Pat. No. 4,241,991.

While these devices fulfill their respective, particular objectives and requirements, the aforementioned patents do not disclose a new photocopy machine capable of storing and transmitting image data. The inventive device includes a housing that contains a scanning means for scanning an image, various types of storage means for digitally storing the scanned image, a printing means for printing a copy of the scanned image, and a transmitting means for permitting transmission of the scanned image to remote outside sources.

In these respects, the photocopy machine capable of storing and transmitting image data according to the present invention substantially departs from the conventional concepts and designs of the prior art, and in so doing provides an apparatus primarily developed for the purpose of scanning an image or document to permit simultaneous facsimile transmitting, printing, and recording on various storage media of the scanned image or document.

SUMMARY OF THE INVENTION

In view of the foregoing disadvantages inherent in the known types of copying machines now present in the prior art, the present invention provides a new photocopy machine capable of storing and transmitting image data construction wherein the same can be utilized for scanning an image or document to permit simultaneous facsimile transmitting, printing, and recording on various storage media of the scanned image or document.

The general purpose of the present invention, which will be described subsequently in greater detail, is to provide a new photocopy machine capable of storing and transmitting image data apparatus and method which has many of the advantages of the copying machines mentioned heretofore and many novel features that result in a new photocopy machine capable of storing and transmitting image data which is not anticipated, rendered obvious, suggested, or even implied by any of the prior art copying machines, either alone or in any combination thereof.

To attain this, the present invention generally comprises a housing that contains a scanning means for scanning an image, various types of storage means for digitally storing the scanned image, a printing means for printing a copy of the scanned image, and a transmitting means for permitting transmission of the scanned image to remote outside sources.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new photocopy machine capable of storing and transmitting image data apparatus and method which has many of the advantages of the copying machines mentioned heretofore and many novel features that result in a new photocopy machine capable of storing and transmitting image data which is not anticipated, rendered obvious, suggested, or even implied by any of the prior art copying machines, either alone or in any combination thereof.

It is another object of the present invention to provide a new photocopy machine capable of storing and transmitting image data which may be easily and efficiently manufactured and marketed.

It is a further object of the present invention to provide a new photocopy machine capable of storing and transmitting image data which is of a durable and reliable construction.

An even further object of the present invention is to provide a new photocopy machine capable of storing and transmitting image data which is susceptible of a low cost of manufacture with regard to both materials and labor, and which accordingly is then susceptible of low prices of sale to the consuming public, thereby making such photocopy machine capable of storing and transmitting image data economically available to the buying public.

Still yet another object of the present invention is to provide a new photocopy machine capable of storing and transmitting image data which provides in the apparatuses and methods of the prior art some of the advantages thereof, while simultaneously overcoming some of the disadvantages normally associated therewith.

Still another object of the present invention is to provide a new photocopy machine capable of storing and transmitting image data for scanning an image or document to permit simultaneous facsimile transmitting, printing, and recording on various storage media of the scanned image or document.

Yet another object of the present invention is to provide a new photocopy machine capable of storing and transmitting image data which includes a housing that contains a scanning means for scanning an image, various types of storage means for digitally storing the scanned image, a printing means for printing a copy of the scanned image, and a transmitting means for permitting transmission of the scanned image to remote outside sources.

Still yet another object of the present invention is to provide a new photocopy machine capable of storing and transmitting image data that reduces the need for multiple machines to perform faxing, copying, computer storage and transmittal between computers.

Even still another object of the present invention is to provide a new photocopy machine capable of storing and transmitting image data that reduces paper costs by eliminating the repeat printing of documents while still permitting distribution of the document through various means.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
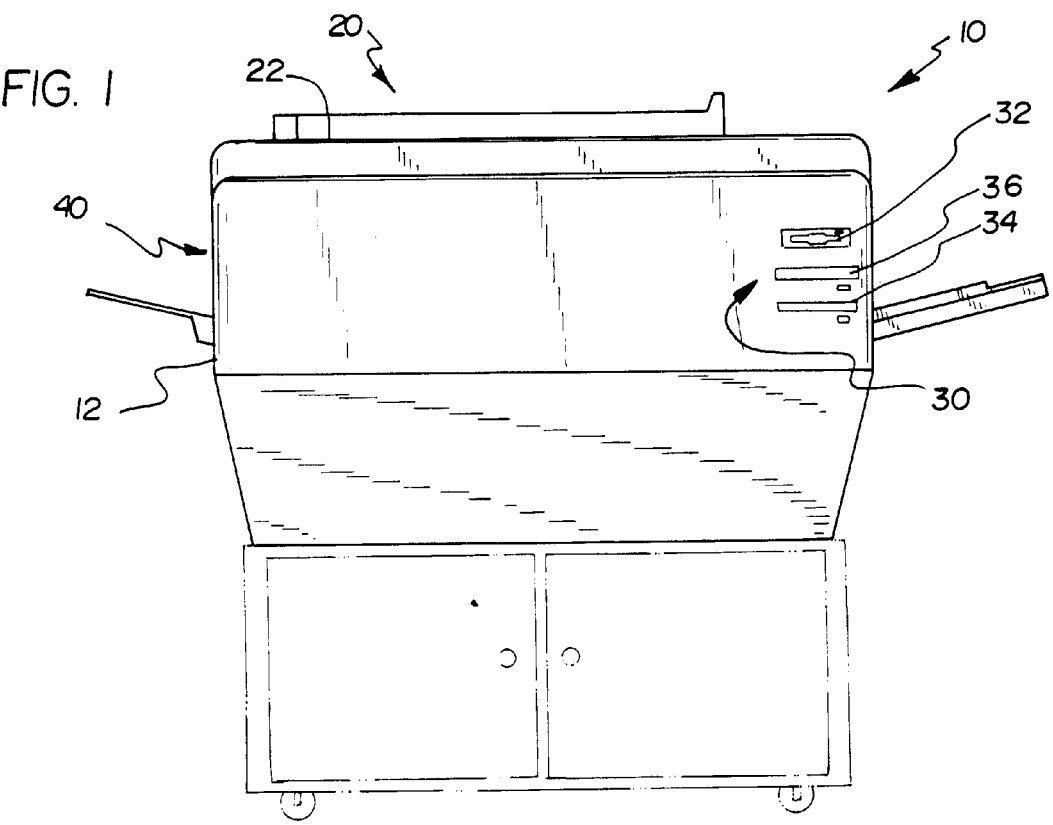
FIG. 1 is a side view of a new photocopy machine capable of storing and transmitting image data according to the present invention.
Figure 2:
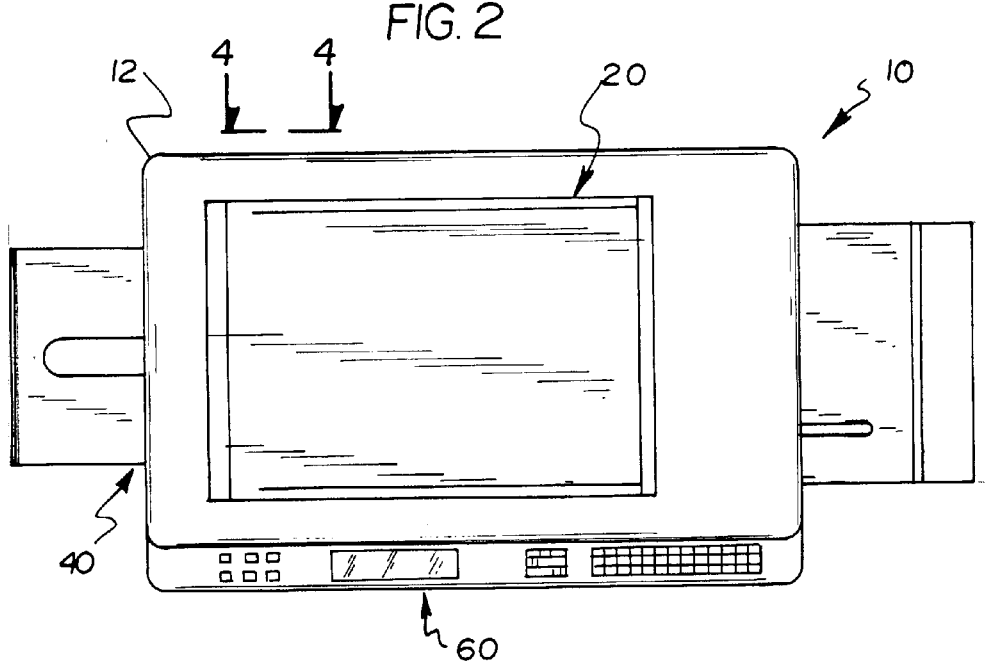
FIG. 2 is a top plan view of the present invention.
Figure 4:
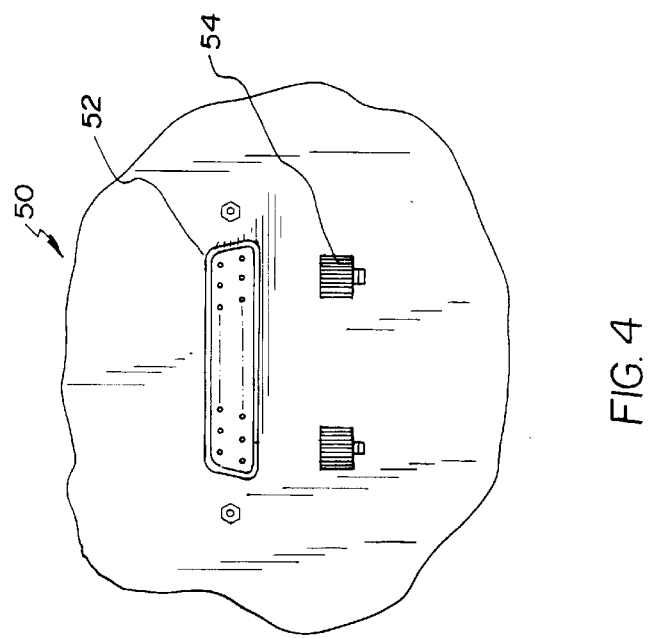
FIG. 4 is a partial side view of the present invention taken along line 4—4 of FIG. 2.
Figure 3:
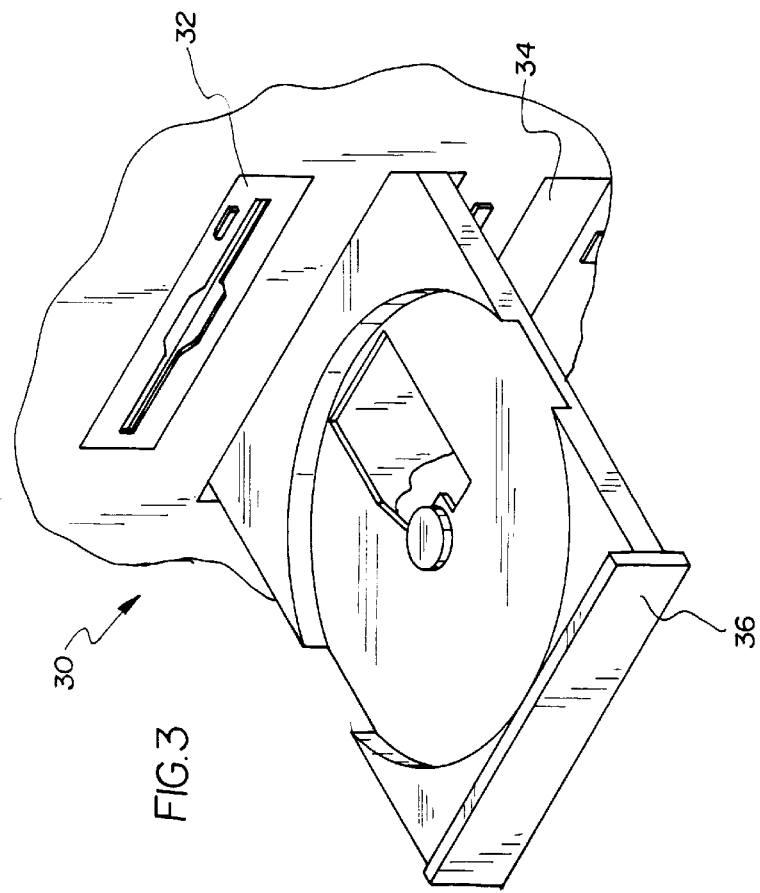
FIG. 3 is a partial perspective view of the present invention.
Figure 5:
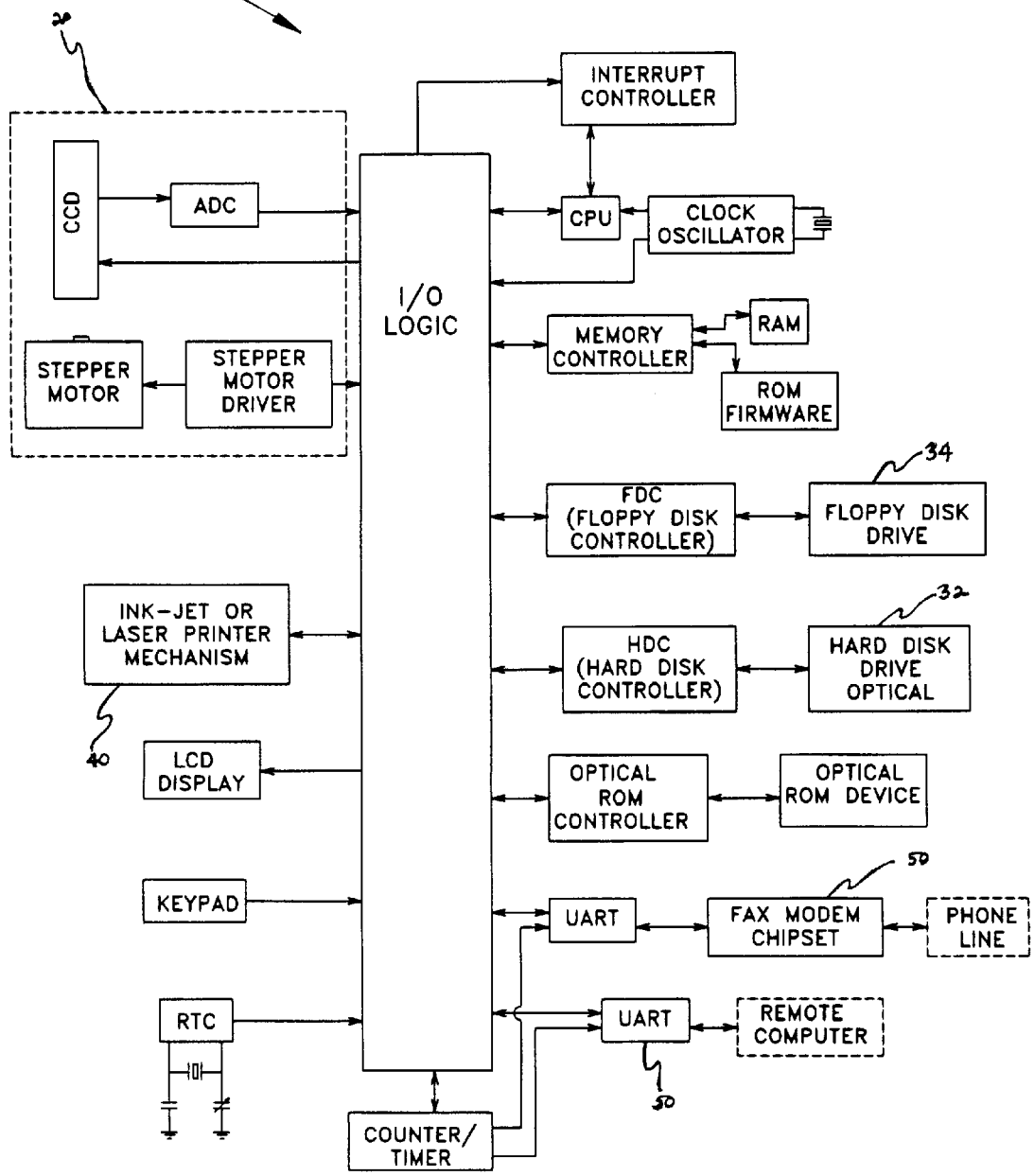
FIG. 5 is a block diagram of the present invention.

With reference now to the drawings, and in particular to FIGS. 1 through 5 thereof, a new photocopy machine capable of storing and transmitting image data embodying the principles and concepts of the present invention and generally designated by the reference numeral 10 will be described.

As best illustrated in FIGS. 1 through 5, the photocopy machine capable of storing and transmitting image data 10 comprises a housing 12 that contains a scanning means 20, various types of storage means 30, a printing means 40, and a transmitting means 50.

The scanning means 20 is designed for scanning an image on a document. Preferably, the scanning means 20 includes a scanning surface 22 where documents are placed on so that the scanning means 20 can scan the images on the document.

The invention includes various storage means 30 designed for storing an image scanned by the scanning means 20. One of the storage means 30 included is a hard disk drive 32. The hard disk drive 32 allows the storing of a digital copy of an image scanned by the scanning means 20.

Preferably, the copying machine 10 includes a storage means that is removable. Ideally, the removable storage means includes a floppy disk drive 34. This allows a user to take a digital copy of the image scanned on the invention to other machines such as a computer to use the scanned digital image in programs on the remote computer. Even more preferably, the copying machine 10 includes a read/write optical storage device 36 as an additional removable storage means 30.

The printing means 40 is designed for printing a copy of an image scanned by the scanning means 20. The printing means 40 can be any sort of printing device currently used in photocopiers.

The photocopy machine capable of storing and transmitting image data 10 also includes a transmitting means 50. The transmitting means 50 is designed to permit transmission of an image scanned by the scanning means 20 to an outside source. The outside sources can be either a printer or a computer. This way the image can be downloaded directly from the invention to a separate printer for printing the image or to a computer for storing the image. Ideally, this transmitting means includes an output port 52 for permitting connection of the outside sources to the photocopy machine capable of storing and transmitting image data 10.

Also preferably, the transmitting means 50 includes a facsimile transmitting device (not shown) for transmitting a facsimile of an image scanned by the scanning means 20. Ideally, the transmitting means also includes a modem 54 for transmitting a scanned image to an other location. Even more preferably, the transmitting means 50 would also permit receiving of facsimile or modem sent images from remote sources to the invention 10. The modem 54 can either be a separate component of the transmitting means 50 or be part of the facsimile transmitting device.

Ideally, the invention also includes a selection means 60. The selection means 60 is designed for allowing a user to selectively activate the various transmission means 50, the printing means 40, the scanning means 20, and the various storage means 30.

For auditing purposes, the photocopy machine capable of storing and transmitting image data 10 may optionally include a counting/recording means (not shown). The counting/recording means is designed for auditing the usage of the copying machine 10.

In use, the counting/recording means allows a user to know what documents have been copied on the invention 10 and how many copies have been made. This way, an auditing user could see if the invention is being used as intended. This way, sites which handle sensitive documents not intended to be reproduced could now make sure that this was not being done. They may not know "who" did the copying but, they would now know that someone did.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A copying machine, comprising:

a scanning means for scanning an image on a document;

a storage means for storing an image scanned by said scanning means;

a printing means for printing a copy of an image scanned by said scanning means;

a transmitting means for transmitting an image scanned by said scanning means to an outside source; and a counting/recording means for auditing the usage of said copying machine;

wherein said scanning means, said storage means, said printing means, and said transmitting means are all included in a housing having an elongated front face, an elongated rear face, and a pair of short side faces;

wherein said printing means includes an output tray coupled to one of said side faces of the housing;

wherein said storage means includes a hard disk drive, said hard disk drive storing a digital copy of an image scanned by said scanning means;

wherein said scanning means includes a scanning surface mounted on a top face of said housing, said scanning surface permitting scanning by said scanning means of images placed on said scanning surface;

wherein said storage means is removable;

wherein said removable storage means includes a floppy disk drive mounted on said front face of said housing;

wherein said removable storage means further includes a read/write optical storage device mounted on said front face of said housing;

wherein said transmitting means includes a facsimile transmitting device for transmitting a facsimile of an image scanned by said scanning means, the facsimile transmitting device including a phone line jack mounted on said rear face of said housing;

wherein said transmitting means further includes a modem for transmitting a scanned image to another location; and a selection means for selectively activating said transmission means, said printing means, said scanning means, and said storage means, the selection means includes a display and a keypad being positioned on said top face of said housing in front of said scanning means.

* * * * *